(12) United States Patent
Egner-Walter et al.

(10) Patent No.: US 7,523,519 B2
(45) Date of Patent: Apr. 28, 2009

(54) WIPER BLADE FOR CLEANING MOTOR VEHICLE WINDOWS

(75) Inventors: Bruno Egner-Walter, Heilbronn (DE); Oliver Lenzen, Sachsenheim (DE); Michael Grandel, Bietigheim-Bissingen (DE); Oliver Blumenstock, Untergruppenbach (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 348 days.

(21) Appl. No.: 10/203,997

(22) PCT Filed: Feb. 20, 2001

(86) PCT No.: PCT/EP01/01888

§ 371 (c)(1), (2), (4) Date: Aug. 15, 2002

(87) PCT Pub. No.: WO01/62561

PCT Pub. Date: Aug. 30, 2001

(65) Prior Publication Data

US 2003/0014828 A1 Jan. 23, 2003

(30) Foreign Application Priority Data

Feb. 21, 2000 (DE) .................... 100 07 800
Feb. 21, 2000 (DE) .................... 100 07 809

(51) Int. Cl.
*B60S 1/38* (2006.01)

(52) U.S. Cl. .................. 15/250.201; 15/250.43

(58) Field of Classification Search ............ 15/250.201, 15/250.43, 250.44, 250.451, 250.452, 250.361
See application file for complete search history.

(56) References Cited

U.S. PATENT DOCUMENTS

| 3,088,155 | A | * | 5/1963 | Smithers | 15/250.201 |
| 3,114,926 | A | * | 12/1963 | Deibel | 15/250.451 |
| 3,317,945 | A | * | 5/1967 | Ludwig | 15/250.48 |
| 3,418,679 | A | * | 12/1968 | Barth et al. | 15/250.201 |
| 3,881,214 | A | | 5/1975 | Palu | 15/250.48 |
| 6,266,843 | B1 | * | 7/2001 | Doman et al. | 15/250.201 |
| 6,292,974 | B1 | * | 9/2001 | Merkel et al. | 15/250.201 |

FOREIGN PATENT DOCUMENTS

| DE | 197 36 368 | 2/1999 |
| DE | 198 01 058 | 7/1999 |

(Continued)

*Primary Examiner*—Gary K Graham
(74) *Attorney, Agent, or Firm*—Young Basile

(57) ABSTRACT

A wiper blade for a wiper system for wiping motor vehicle windows includes a wiper blade rubber squeegee, which has a wiping lip that faces the window, a rear part that faces away from the window, and a tilting connecting element that joins the wiping lip to the rear part. The wiper blade also includes a strip-like elastic supporting element, or at least one spring rail, which stabilizes the wiper blade rubber squeegee. The supporting element can be joined to a wiper arm which can be transversally driven with regard to the longitudinal extension of the wiper blade and which can be tensioned against the window. The wiper blade is additionally provided with a casing or covering which surrounds, at least in sections, the rear part and the supporting element or the at least one spring rail. The casing is provided with a streamlined form, surrounds the rear part, and when viewed in a direction parallel to the window and of the longitudinal extension of the wiper blade, covers the tilting connecting element. Alternately, the covering is held on the at least one spring rail.

21 Claims, 3 Drawing Sheets

FOREIGN PATENT DOCUMENTS

| | | |
|---|---|---|
| FR | 2 679 185 | 6/2000 |
| GB | 2106775 * | 4/1983 |
| GB | 2 346 318 | 9/2000 |
| WO | WO 00/34090 | 6/2000 |

* cited by examiner

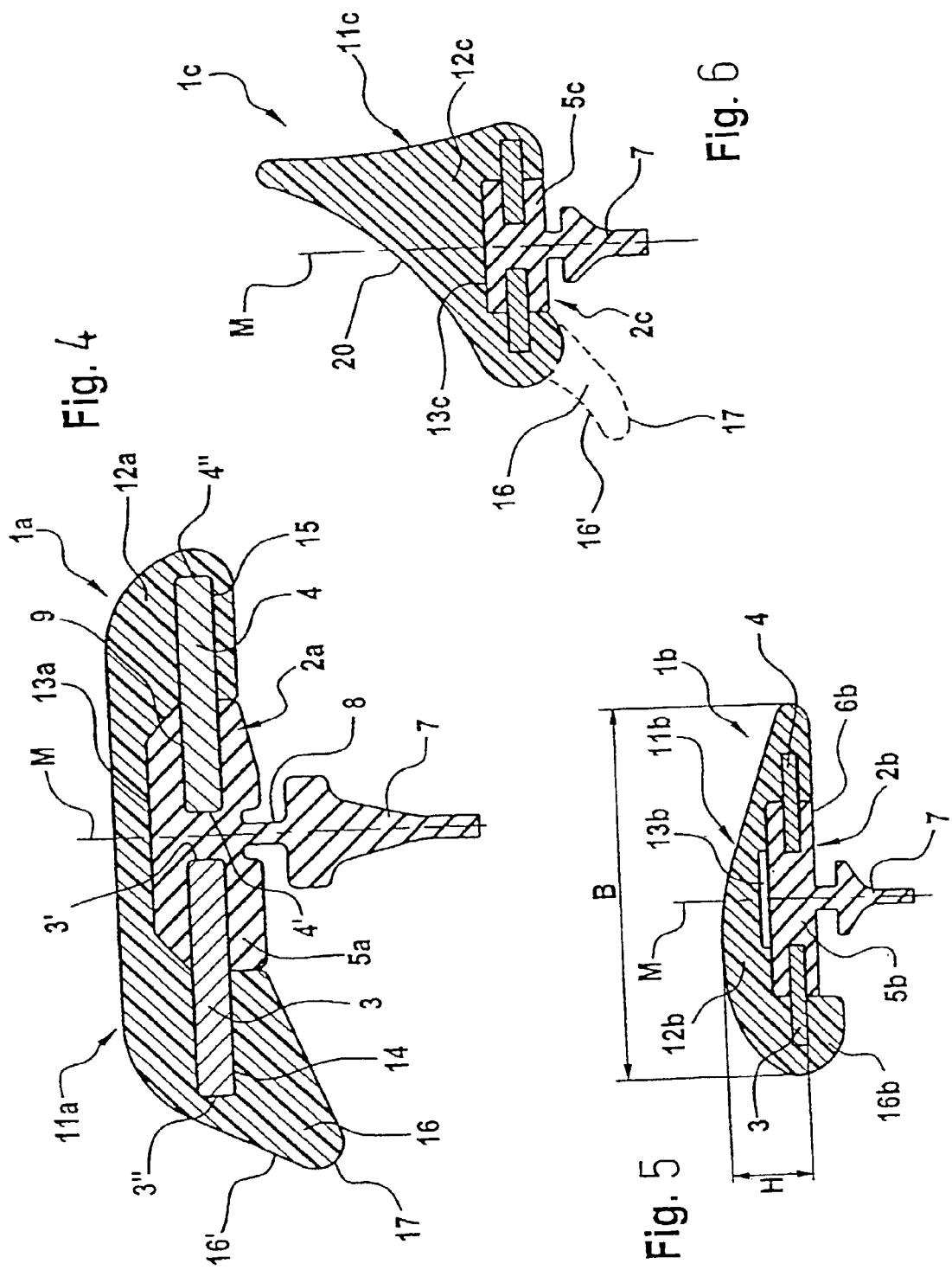

WIPER BLADE FOR CLEANING MOTOR VEHICLE WINDOWS

BACKGROUND

The invention relates to wiper blades.

Wiper blades are known from DE 299 03 123 U1 which have a resilient insert with a tube-like elastomer sheath, into which a wiper rubber is inserted. With wiper blades of this type the supporting element is supposed to ensure the most even distribution possible of the contact pressure on the windshield emanating from the wiper arm over the entire area swept by the wiper blade. The supporting element is advantageously pre-curved in a suitable way to achieve the necessary even contact pressure of the wiper blade against the windshield. A supporting element of this type replaces the costly bow design with two splines located in the wiper body, such as is the practice with traditional wiper blades and is known, for example, from DE 15 053 97 A1.

The generic, known wiper blades do, however, have the disadvantage that their construction is costly. In addition to the supporting element, a wiper blade of this type furnishes transverse bars disposed perpendicularly to the supporting element, recesses located in the supporting element and locating grooves in the wiper rubber to receive the casing which surrounds the supporting element at least in sections. Such a construction results in an overall height which cannot be ignored and is accompanied by great disadvantages during operation. For example, the side of the wiper blade facing the air stream offers a fairly large target for the air stream striking the wiper blade. Furthermore, a substantial vacuum builds up on the back side of the wiper blade facing away from the air stream. It is true that the wiper blade constantly changes its position with respect to the oncoming air stream, generally carrying out a oscillating motion during operation, but even then one longitudinal side of the wiper blade is always facing the air stream more or less directly. Because of the air stream affecting the wiper blade, the wiper blade's contact pressure is reduced to such an extent that the wiper blade tends to lift off and flutter, rendering proper wiper performance impossible. Increasing the wiper blade's contact pressure against the glass can mitigate this problem at high speeds, but at low speeds, when the attempt of the wiper blade to lift is reduced, friction between the wiper blade and the glass is increased, resulting in undesirable noise and unacceptably high loading of the drive components and of the wiper rubber.

Wiper blades are known from DE 197 36 368 A1 of a type which essentially consist of a wiper body and at least one spline connected to this wiper body. These wiper blades, often described as "flat wiper blades", have the disadvantage that the protruding splines generate extremely irritating noises, caused particularly by the air stream, and also represent a hazardous source of injuries.

SUMMARY

The invention is to demonstrate a wiper blade which, while retaining the basic advantages of a known wiper blade, has improved properties.

This object is achieved under the invention in the case of a wiper blade by giving an aerodynamic shape to the casing which completely surrounds the supporting element and the back part in the longitudinal extension of the wiper blade and covers the hinge when viewed parallel to the glass along the longitudinal extension of the wiper blade.

A wiper blade of this type has the specific advantage that it can be designed to be extremely shallow and creates only a very small target for the air stream. Since the supporting element, the back part and, in particular, the hinge are covered by the casing, a very small target is offered to the oncoming flow of air impinging on the wiper blade approximately parallel to the glass.

A further advantage of the invention is that because of the simple construction of the wiper blade under the invention, the wiper blade has a very low overall weight and is easily to assemble.

In one advantageous aspect of the invention the casing also covers the part of the wiper lip facing away from the glass. The wiper blade can thereby be made even shallower and even more favorable wiper blade air flow characteristics can be achieved.

In one aspect of the invention, advantageous provision can be made for the casing to have a largely elliptical cross section. Just such an elliptic cross section demonstrates relatively low aerodynamic drag. Additionally, the wiper body under the invention can be designed to be very shallow by means of an elliptical cross section.

In an especially preferred aspect of the invention, the casing has a surface texture at least in sections to reduce aerodynamic drag. This too helps to achieve even better wiping characteristics for the wiper blade under the invention.

It is specifically conceivable that the surface texturing has spherical segment-shaped dimples. Such dimples result in a favorable turbulent boundary layer on the surface of the casing based on the golf ball effect and additionally reduce the drag of the wiper blade against which the air stream is flowing. Furthermore, positive visual effects can be achieved with a surface textured in this way, appealing particularly to the person viewing the wiper blade.

In another aspect of the invention, the casing has a turbulence generator on the windward side. Such a turbulence generator is furnished to create a turbulent boundary layer which has positive effects on the wiping characteristics of the wiper blade from the invention.

In a further aspect of the invention, the wiper body with the hinge is flexibly disposed in a direction running orthogonally to the glass. As a result of such an arrangement, the wiper blade's contact pressure is distributed evenly over the wiper blade and the wiping characteristics of the wiper blade are improved.

In another further aspect of the invention, the back part for the flexible arrangement of the wiper lip has a membrane area. A membrane area positioned in this way suggests itself because the back part is positioned immediately above the wiper lip and the hinge.

What can additionally be achieved by the presence of the membrane area in the area between the hinge and the side of the back part facing away from the hinge is that the flexible motion of the wiper lip introduced via the hinge can be positively influenced.

In a related further aspect of the invention, it is envisioned that the membrane area is formed by cavities present in the back part. Such cavities can be realized in a simple and inexpensive way in the back part of the wiper body.

Advantageous provision can be made in a further aspect of the invention for the wall thickness between the cavity and the side of the back part facing the wiper strip to be roughly equal to the wall thickness of the hinge. A particularly favorable springily flexible rocking motion of the rubber lip can thereby be achieved.

In a particularly preferred aspect of the invention, the casing possesses intrinsic stability which stabilizes the wiper blade in its entirety and counteracts plastic deformation of the supporting element. The casing thereby assumes the retaining function for the wiper blade, together with the supporting element. Designing the intrinsic stability of the casing accordingly can specifically have a positive influence on the overall spring characteristic curve of the wiper blade.

In a further inventive aspect of the invention, the casing also encloses the free ends of the supporting element and of the back part. This can additionally increase the intrinsic stability of the casing, whereby the wiping characteristics of the wiper body can likewise be improved.

As part of the invention is it also conceivable that the casing has end caps at its free ends. Such caps, which are specifically designed to be detachable, have the advantage that the wiper rubber can be removed if necessary, or replaced.

One variant of the invention provides for bonding the side of the supporting element facing the back part to the side of the back part facing the supporting element. Improved torsional stiffness of the wiper blade can be achieved through such bonding.

In another aspect of the invention, the supporting element is a metallic spring element and the casing is a plastic element. The use of such materials has proven to be particularly advantageous.

Under the invention, provision can also be made for the supporting element to be coated, specifically plastic coated. The supporting element is protected particularly from environmental factors, e.g., rain water, through such a coating.

BRIEF DESCRIPTION OF THE DRAWING

The invention as well as further advantageous aspects and details are described and explained in greater detail in what follows in conjunction with the embodiments shown in the drawings.

FIGS. 3-6 show various possible aspects of the wiper blade in accordance with the invention, in each case simplified and in section.

DETAILED DESCRIPTION

Figure 1:
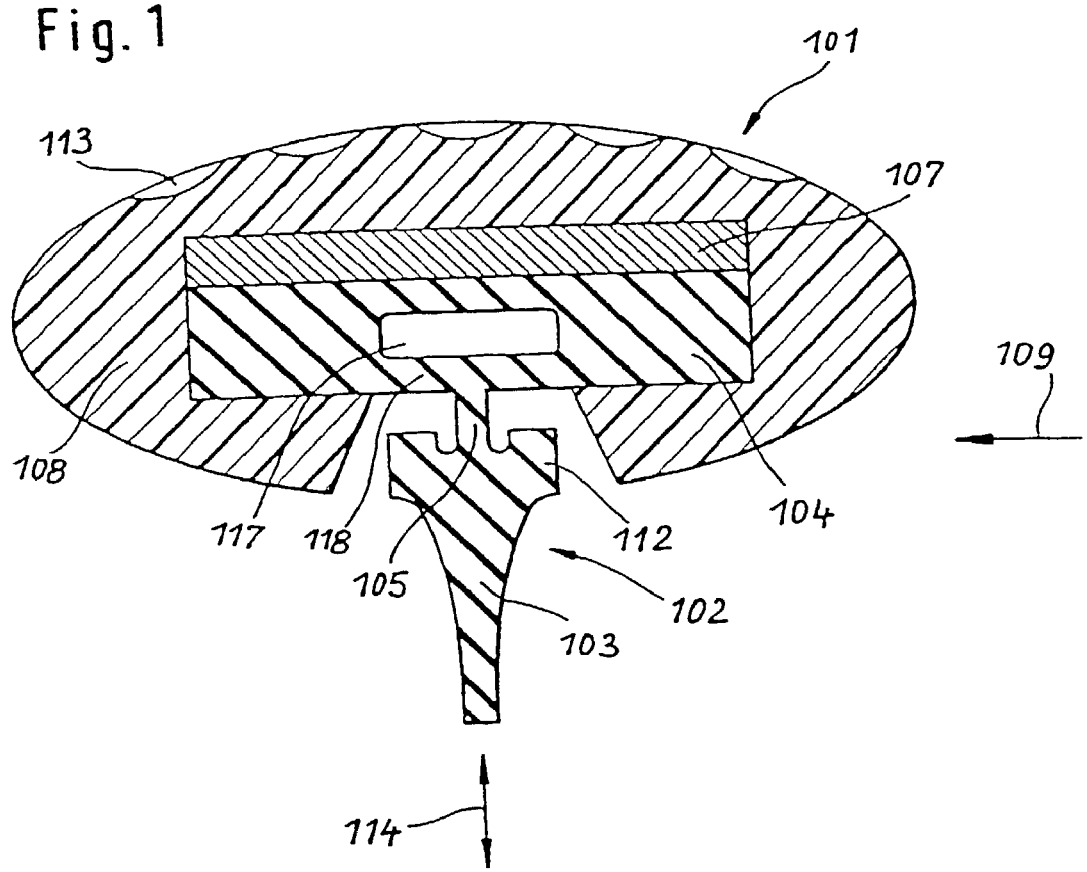
FIG. 1 shows a cross section through a first embodiment of a wiper blade under the invention.

FIG. 1 shows a wiper blade 101 under the invention for a wiping device for wiping vehicle windows having a wiper rubber 102 which possesses a wiper lip 103 facing the glass, a back part 104 facing away from the glass and a hinge 105 which connects the wiper lip 103 to the back part 104. In the cross section shown in FIG. 1, a stabilizing, strip-like, elastically flexible support element 107 is shown in addition, which is preferably bonded to the side of the back part 104 facing the supporting element 107. The supporting element 107 and the back part 104 of the wiper rubber 102 is completely enclosed by a casing 108. The casing 108 is aerodynamically shaped and possesses a largely elliptical form. In a view parallel to the glass directed along the longitudinal extension of the wiper blade 101, which corresponds to a view matching arrow 109, the hinge 105 and a part 112 of the wiper lip 103 facing away from the glass are covered by the casing 108.

On the side facing away from the wiper lip 103, the casing 108 has surface texturing, namely, spherical segment-shaped dimples 113, which are furnished to reduce the aerodynamic drag of the wiper blade based on the so-called golf ball effect. The spherical segment-shaped dimples can be seen particularly clearly in FIG. 2.

Figure 2:
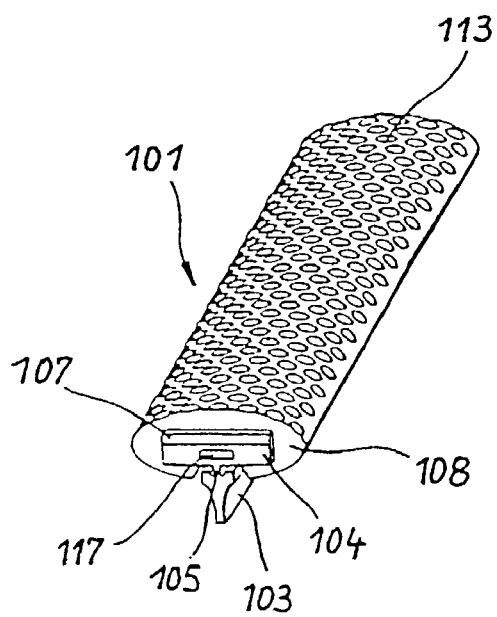
FIG. 2 shows a perspective view of a section of the wiper blade from FIG. 1.

In the inventive wiper blade 101 shown in FIG. 1 and FIG. 2, the wiper lip 103 with the hinge 105 is supported flexibly in an orthogonal direction to the glass, indicated by arrow 114. The back part 104 has a membrane area for this flexible seating, namely, a cavity 117 in the back part extending in the longitudinal direction of the wiper blade 103. For optimal flexibility as well as to improve the pivoting characteristics of the wiper lip, provision is made for the wall thickness 118 between the cavity 117 and the side of the back part 104 facing the wiper lip 101 to be roughly the same as the wall thickness of the hinge 105.

In the case of the wiper blade 101 shown in FIGS. 1 and 2, the supporting element 107 is advantageously a metallic spring element. The use of such a supporting element 107 has the advantage that increased torsional stiffness of the wiper blade can be achieved.

As can be seen particularly clearly from FIG. 2, the casing 108 extends over the entire length of the wiper blade 101. Because of the wall thickness of the casing 108, which is clearly seen in FIG. 1, the casing possesses good intrinsic stability, which stabilizes the wiper blade 101 in its entirety and specifically counteracts any possible plastic deformation of the supporting element 107 caused by external influences.

The wiper blade 101 shown in FIGS. 1 and 2 is configured/designed extremely shallow and demonstrates very low aerodynamic drag, particularly as a result of the elliptical cross section of the wiper lip 103, which is largely covered by the casing 108 in the direction of flow 109 of the air stream, and of the spherical segment-shaped dimples 113 on the surface of the casing 108. Consequently, lower air flow forces are operating on the inventive wiper blade 101, particularly at higher speeds. Lifting of the wiper blade 101 from the vehicle windshield is largely eliminated.

Figure 3:
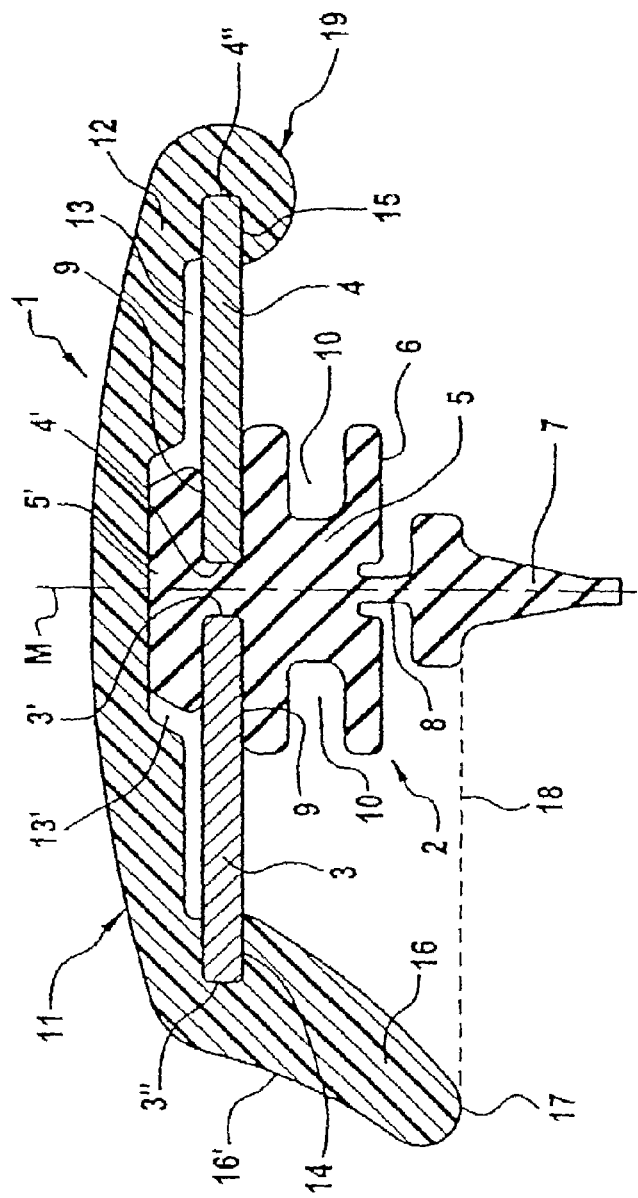

The wiper blade shown in FIG. 3 identified generally with reference numeral 1 consists in a manner known of a wiper strip 2, which is manufactured from a flexible rubber material, specifically for example by injection molding, pressing or extrusion, and of two flat strip-like splines 3 and 4, each of which is made from a springy flat-strip material, for example from spring steel or spring strip steel and which like the wiper strip 2 extend over the entire length of the wiper blade 1.

The cross-sectional profile of the wiper strip 2 is comprised of an upper profiled section or wiper strip body 5 and of wiper lip 7 projecting beyond the underside 6 of this wiper strip body, said lip being produced in one piece with the wiper strip body 5 via a hinge 8, and when the wiper blade 1 is in operation presses against the vehicle glass to be cleaned.

M identifies a center plane in FIG. 3, which includes the longitudinal axis of the wiper strip 2 and lies perpendicular to the plane of the drawing in FIG. 3. The wiper strip 2, its body 5, the wiper lip 7 and the hinge 8 are configured symmetrically to this center plane M.

The wiper strip 2 is configured on each longitudinal side with two grooves 9 and 10 open to the longitudinal side and to the ends of the wiper strip 2, of which groove 9 is at a greater distance from the underside 6 and groove 10 is at a lesser distance. A spline 3 or 4 is partially seated in each groove 9, specifically along an inner longitudinal edge 3' or 4' of the particular spline 3 or 4. The greater part of the width of each spline 3 or 4 projects laterally out of the particular groove 9. In each instance the splines 3 and 4 lie with their surface sides, i.e. with their top and bottom sides, in a common plane running perpendicular to the center plane M. In the embodiment shown about two-thirds of the width of each spline 3 and 4 projects from the particular groove 9. At least at both ends of the wiper blade 1 the splines 3 and 4 are connected to each other in a known way, for example by a connecting element, and thereby also retained to the wiper strip 2.

A casing or cover 11 is disposed on the upper side of the arrangement formed by wiper strip 2 and the splines 3 and 4 facing away from the wiper lip 7. The cross section of the cover 11 is formed by a strip-like section or body 12 which is curved convexly on its upper side facing away from wiper lip 7, essentially symmetrical to the center plane M, around axes of curvature parallel to the longitudinal extension of wiper blade 1. On the underside facing the wiper strip 2, the body 12 is furnished with a concavity 13 which in the embodiment shown is configured essentially symmetrical to the center plane M and in which the two splines 3 and 4 are seated with their areas projecting from the grooves 9 together with at least an upper section 5' of the wiper strip body 5. To receive the section 5', the concavity 13 has a depression 13' in the center extending over the entire length of the concavity 13, the cross section of said depression 13' being matched to the trapezoidal cross section of section 5' forming the upper side of the wiper strip 2. The outwardly lying longitudinal edges 3" or 4" of splines 3 and 4 both engage grooves 14 or 15 which are formed on the longitudinal sides of the concavity 13 so that the cover 11 is retained via the splines 3 to the wiper blade 1. The two splines 3 and 3 are in turn located only with one part of their width by grooves 3" and 4" so that one part of their width in each case extends freely between grooves 8 and 14 or 15, respectively.

On the one side extending in the longitudinal direction of wiper blade 1, the body 12 transitions into a strip-like section 16 projecting beyond the underside of the cover 11 and extending over the entire length of the cover 11, which section, with the cover 11 installed, lies with its lower open edge 17 on a common level 18 with the upper area of the wiper lip 7 facing the hinge relative to a plane perpendicular to the center plane M. During operation, wiper blade 1 is mounted on the particular vehicle such that the longitudinal side of wiper blade 1 furnished with section 16 forms the leading longitudinal side of the wiper blade in the direction of travel. Section 16 forms a forward-mounted spoiler, specifically with an outwardly located spoiler surface 16' facing away from the wiper strip 2, which surface seen as a whole with one plane perpendicular to the center plane M includes an angle of less than 90° which opens toward wiper strip 2 and which is convexly curved around axes parallel to the longitudinal axis of the wiper blade.

On the other longitudinal side, i.e. in the area of the groove 15, the cover 11 forms a bulbous edge 19.

Cover 11 is manufactured from a suitable elastic material, for example, from elastomeric plastic, also for example, by extruding a suitable profile. The possibility also exists in principle of then producing cover 11 in an injection molding process or by pressing, when it is then possible to shape concavity 13 in such a way that it is also closed laterally at the two ends of cover 11, for example, with an edge corresponding to edge 19, so that wiper strip 2 and splines 3 and 4, or the means connecting these splines at the wiper blade ends respectively, are also covered on their end faces by cover 11. Naturally it is understood that the length of the cover 11 is in any case selected such that it covers the wiper blade 2 and the splines 3 and 4 over the entire length, as well as the connecting elements furnished at the ends of the wiper blade for the splines 3 and 4.

The advantages of the cover 11 include the following:
risk of injury from the splines protruding laterally beyond the wiper strip 2 is prevented;
an aerodynamically optimal outer contour is achieved for the wiper blade by the cover 11, so that annoying noise generated by the air stream at high speeds is prevented, while retaining good wiping quality;
it is furthermore possible by using the cover 11 to configure the splines 3 and 4 to have great width in comparison to wiper strip 2, or conversely the keep the wiper strip 2 narrow and compact, where the cross section of splines 3 and 4 can be selected in each instance such that an optimal contact of wiper blade 1 against the vehicle window and thus optimal wiping quality is achieved.

A further advantage of wiper blade 1 lies in the fact that, through the form of the cover 11, specifically through the forward-mounted spoiler formed by section 16, especially low drag is achieved and air is prevented from passing under the wiper blade, with the associated deterioration in wiping quality.

FIG. 4 shows a wiper blade 1a as a further possible aspect which consists of wiper strip 2a corresponding to wiper strip 2 having the wiper strip body 5a and the wiping lip 7 formed on via the hinge 8, and of the two splines 3 and 4 and of the cover 11a. Wiper blade 1a differs initially from wiper blade 1 in that the wiper strip body 5a has only a groove 9 on each long side, and the grooves 9, as well as the grooves 14 and 15 on the sides of concavity 13a corresponding to concavity 13, are selected in their depth so that the splines 3 and 4 are each accommodated over their entire width by a groove 9 and the adjacent groove 14 or 15, respectively. Furthermore, the concavity 13a is adapted to the cross section of the wiper strip body 5a such that the later completely fills the concavity 13a, or is essentially accommodated completely by the concavity 13a.

In the case of wiper blade 1a, the cover 11a is configured flat on its upper side and slightly rounded to the adjacent long sides, where the cover 11a on the forward long side of the wiper blade 1a facing the direction of travel when in operation in turn forms the strip-like projection 16 with the open edge 17 projecting beyond the underside of the cover.

FIG. 5 shows as a further aspect a wiper blade 1b which is very similar to wiper blade 1a and consists of the wiper strip 2b and the wiper lip 7 formed on via the hinge, of the two splines 3 and 4 and the cover 11b. In the case of this aspect, the wiper strip body 5b, which is rectangular in cross section, is completely accommodated in the concavity 13b of the cover 11b, said concavity being adapted to this cross section. The cover 11b, or its body 12b, respectively, have a tear dropshaped cross-sectional profile, i.e., a cross-sectional profile which is similar to the cross section of half a water drop. The outer surface or outer contour of the cover 11b is configured asymmetrically to the center plane M, in particular around axes of curvature running parallel to the longitudinal extension of wiper blade 1b, such that the radius of the curvature is small at the left edge in FIG. 5 and starting from this left edge increases to the right long side. The design is furthermore carried out such that the height-to-width ratio is in the range between 1:8 and 1:4, where B is the maximum width of the cover 11b in the axial direction perpendicular to the center plane M, and H is the maximum height, or the maximum distance respectively between the plane of the undersides of the splines 3 and 4 and the upper side of the cover 11b. The splines 3 and 4 in turn lie with their surface sides in common planes perpendicular to center plane M.

As FIG. 5 also shows, the cover 11b terminates flush with the underside of the wiper strip 2b in the area of the right long side in this figure, i.e. in the area of spline 4, while on the opposite long side, i.e. in the area of spline 3, the cover 11b forms a section 16b projecting beyond the underside 6b and extending over the entire length of cover 11b. This section turn in turn lies with its lower open edge—with reference to a plane perpendicular to the center plane M—on the same level as the upper area of the wiper lip 7 and augments the tear-drop shape of the cover 11*b* on this long side. In operation, section 16*b* is at the forward long side of the wiper blade facing the direction of travel.

Wiper blade 1*b* has the advantage of especially low drag resulting from the described shape of the cover 1*b,* where wind noise is also greatly reduced. To further reduce wind noise, the surface around which air flows can also be furnished with small additional elevations, for example on the magnitude of 0.1-2 mm.

FIG. 6 shows as a further possible aspect a wiper blade 1*c* which differs essentially from wiper blade 1*b* only in that in place of the cover 11*b* with the tear-drop contour a cover 11*c* is provided whose body 12*c* is configured as a spoiler having a spoiler surface 20. As is shown in FIG. 6 by broken lines, the possibility exists of furnishing the cover 11*c* with the downwardly protruding section 16 on the long side where the spoiler surface 20 has the least distance from the vehicle window to be cleaned and forms the forward long side of the wiper blade with reference to the direction of travel.

Through the spoiler-like configuration of cover 11*c* the drag of wiper blade 1*c* is somewhat increased, but this shape for cover 11*c* has the advantage that the high-speed characteristics of wiper strip 1*c* are substantially improved.

Figure 7:
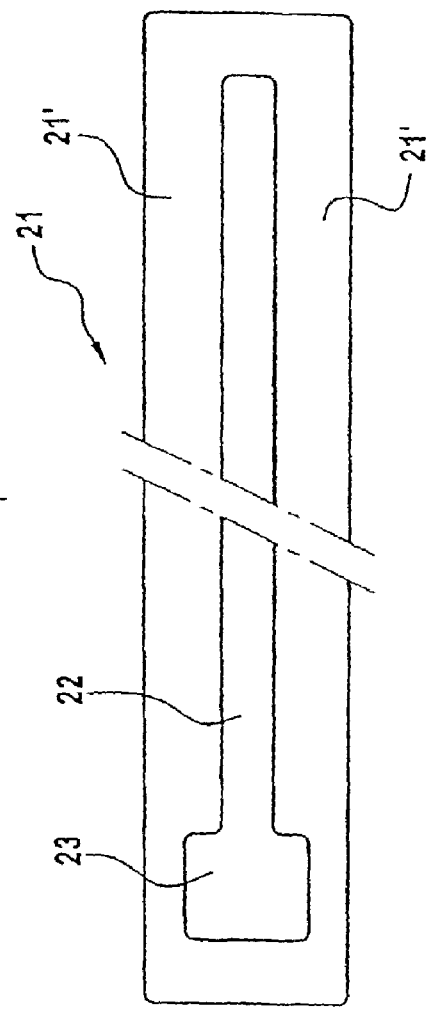
FIG. 7 shows a simplified top view of a spline for use in one of the wiper blades from FIGS. 3-6.

FIG. 7 shows in simplified form and in plan view a spline 21 which is formed from a length of a springy flat material, namely for example of spring strip steel, and is furnished in a suitable way, for example by stamping, with a slot 22 which is closed at both ends of the spline 21. At one end of the spline the slot 22 is enlarged to form an insertion opening 23.

The width of the slot 22 (outside of the insertion opening) corresponds to the distance between the inside long edges 3' and 4' of splines 3 and 4 in FIGS. 3-6. In the area of the insertion opening 23, in a direction perpendicular to its longitudinal extension, slot 22 has a width which is roughly equal to the width of the particular wiper strip 2-2*c,* so that the particular wiper strip can be attached to the spline 21 by being threaded through the opening 23 in such a way that the sections 21' of the spline 21 provided on both sides of the slot can engage grooves 9 and 14, as described in what preceded for splines 3 and 4, respectively.

The spline 21 can be used for wiper blades 1-1*c* in place of individual splines 3 and 4. In principle, spline 21 can also be used with other wiper blades which consist of a wiper strip and two splines engaging in lateral grooves of the wiper strip.

All the features presented in the description, the subsequent claims and the drawing can be fundamental to the invention both individually as well as in any given combination with each other.

What is claimed is:

1. In a flat, yokeless wiper blade for cleaning vehicle windows having an elongate wiper strip of a flexible material which is produced in a single piece in the area of its underside with at least one wiper lip which can be pressed against the vehicle window, as well as with at least one spline extending in the longitudinal direction of the wiper strip and retained against the wiper strip, the spline projecting with at least one outwardly lying longitudinal edge beyond one longitudinal side of the wiper strip, the improvement comprising:

the flat, yokeless wiper blade connectible directly to a wiper arm and having a cover and retained on the at least one spline disposed directly on the wiper strip on an upper side facing away from wiper lip, the cover having a forward portion extending below a trailing portion to define an aerodynamically shaped forward mounted spoiler, and in a view directed parallel to the window along the longitudinal extension of the wiper blade, the forward mounted spoiler extends along only one longitudinal side of the wiper blade toward the window a sufficient distance to cover a hinge connecting the at least one wiper lip to the wiper strip.

2. The wiper blade of claim 1, wherein the cover also covers the at least one spline.

3. The wiper blade of claim 1, wherein the cover is retained by engaging the at least one spline.

4. The wiper blade of claim 1, wherein the cover has recesses into which the at least one spline engages with its outwardly lying longitudinal edges.

5. The wiper blade of claim 1, wherein the cover is furnished on an underside facing the underside of the wiper strip with a concavity in which the wiper strip is at least partially accommodated.

6. The wiper blade of claim 1, wherein two separate splines are provided, each of which engages a longitudinal groove in the wiper strip and projects from this groove beyond the specific side of the wiper strip.

7. The wiper blade of claim 1, wherein a single spline is provided, which projects with each of two longitudinal edges beyond a longitudinal side of the wiper strip and wherein the cover is retained on both longitudinal edges of the spline.

8. The wiper blade of claim 7, wherein the spline forms spline sections on both sides of at least one slot.

9. The wiper blade of claim 8, wherein the spline sections are each accommodated in a longitudinal groove in the wiper strip and wherein the slot in the spline is at least partially occupied by the material of the wiper strip.

10. The wiper blade of claim 1, wherein the cover is configured like a cap, with a convexly curved top side.

11. The wiper blade of claim 1, wherein the cover has an external contour corresponding in cross section to at least part of a water drop.

12. The wiper blade of claim 1, wherein the cover is configured on its top side as a spoiler with at least one spoiler surface.

13. The wiper blade of claim 1, wherein the spoiler is formed as a strip-like section.

14. The wiper blade of claim 1, wherein the cover is produced from a flexible material.

15. A yokeless wiper blade for cleaning vehicle windows comprising:

an elongate wiper strip of a flexible material produced in a single piece in an underside area with at least one wiper lip to be pressed against a vehicle window;

at least one spline extending in a longitudinal direction of the wiper strip and retained against the wiper strip, the spline projecting with at least one outwardly lying longitudinal edge beyond our longitudinal side of the wiper strip; and a casing connectible directly to a wiper arm without intervening yokes and retained on the at least one spline disposed directly on the wiper strip on an upper side facing away from wiper lip, the casing having a forward portion extending below a trailing portion to define an aerodynamically shaped forward mounted spoiler, and in a view directed parallel to the window along the longitudinal extension of the wiper blade, the forward mounted spoiler extends along one longitudinal side of the wiper blade toward the window a sufficient distance to cover a hinge connecting the at least one wiper lip to the wiper strip, wherein the combination of the casing and the at least one spline provide sufficient curvature, stiffness, and spring resistance to matingly match a contoured surface of a vehicle window to be wiped.

16. The wiper blade of claim 15, wherein the casing covers a part of the wiper lip facing away from the glass.

17. The wiper blade of claim 15, wherein the wiper lip has a hinge located to flex in a direction running orthogonally to the glass.

18. The wiper blade of claim 15, wherein the casing has intrinsic stability which stabilizes the wiper blade in its entirety and counteracts any plastic deformation of the at least one spline.

19. The wiper blade of claim 15, wherein the casing has end caps at open ends.

20. The wiper blade of claim 15, wherein the at least one spline is a spring metal element and the casing is a plastic element.

21. The wiper blade of claim 15, wherein the at least one spline is coated.

* * * * *